United States Patent
Kishiyama

(10) Patent No.: US 9,553,660 B2
(45) Date of Patent: Jan. 24, 2017

(54) HYBRID ORTHOGONAL/NON-ORTHOGONAL MULTIPLE ACCESS FOR RADIO SIGNAL TRANSMISSION AND RECEPTION

(75) Inventor: Yoshihisa Kishiyama, Chiyoda-ku (JP)

(73) Assignee: NTT DOCOMO, INC., Tokyo (JP)

( * ) Notice: Subject to any disclaimer, the term of this patent is extended or adjusted under 35 U.S.C. 154(b) by 261 days.

(21) Appl. No.: 14/111,708

(22) PCT Filed: May 17, 2012

(86) PCT No.: PCT/JP2012/062648
§ 371 (c)(1),
(2), (4) Date: Oct. 14, 2013

(87) PCT Pub. No.: WO2012/161082
PCT Pub. Date: Nov. 29, 2012

(65) Prior Publication Data
US 2014/0050279 A1    Feb. 20, 2014

(30) Foreign Application Priority Data

May 20, 2011   (JP) ................. 2011-114034
Oct. 14, 2011  (JP) ................. 2011-227152

(51) Int. Cl.
*H04J 4/00*   (2006.01)
*H04L 27/06*  (2006.01)
(Continued)

(52) U.S. Cl.
CPC ............. *H04B 7/24* (2013.01); *H04J 11/004* (2013.01); *H04J 11/0059* (2013.01); *H04L 27/2647* (2013.01)

(58) Field of Classification Search
CPC ...... H04J 11/004; H04J 11/0059; H04J 15/00; H04J 11/003; H04J 11/0036; H04L 27/2647; H04L 27/2626; H04B 7/2615; H04B 10/564
See application file for complete search history.

(56) References Cited

U.S. PATENT DOCUMENTS 8,750,090 B2 *  6/2014  Takata ............... H04J 13/0003
                                                 370/203
8,797,993 B2 *  8/2014  Tong ................... H04B 7/0408
                                                 370/330
(Continued)

FOREIGN PATENT DOCUMENTS

JP    2009 10752     1/2009
JP    2009-111995    5/2009
(Continued)

OTHER PUBLICATIONS

Dahlman, E. et al., "4G: LTE/LTE-Advanced for Mobile Broadband", Academic Press, pp. 152-158, (Mar. 2011).
(Continued)

*Primary Examiner* — Ahmed Elallam
(74) *Attorney, Agent, or Firm* — Oblon, McClelland, Maier & Neustadt, L.L.P.

(57) ABSTRACT

Provided are a receiver, a transmitter and a radio communication method capable of using non-orthogonal multiple access while suppressing cost increase and processing delay. A mobile station 200A receives non-orthogonal signals, also receives a reference signal to be used for interference cancellation, and extracts the non-orthogonal signal addressed to the mobile station 200A from the received non-orthogonal signals by demodulating and cancelling the radio signal addressed to another mobile station. In addition, the mobile station 200A demodulates the extracted non-orthogonal signal addressed to the mobile station 200A on the basis of the reference signal. The reference signal is multiplexed in the same radio resource block as a resource block allocated to the non-orthogonal signals, and is multi-
(Continued)

plexed in the radio resource block only when at least one signal is scheduled in the radio resource block.

10 Claims, 7 Drawing Sheets

(51) Int. Cl.
*H04L 27/20* (2006.01)
*H04B 7/24* (2006.01)
*H04J 11/00* (2006.01)
*H04L 27/26* (2006.01)

(56) References Cited

U.S. PATENT DOCUMENTS

| | | | | |
|---|---|---|---|---|
| 2003/0174675 | A1* | 9/2003 | Willenegger | H04B 7/022 370/335 |
| 2007/0291634 | A1* | 12/2007 | Kwon | H04L 27/2601 370/208 |
| 2008/0062857 | A1 | 3/2008 | Monogioudis et al. | |
| 2008/0130481 | A1* | 6/2008 | Fujii | H04W 16/12 370/203 |
| 2010/0290548 | A1 | 11/2010 | Hoshino et al. | |
| 2012/0300653 | A1* | 11/2012 | Kishiyama | H04J 11/005 370/252 |
| 2013/0003641 | A1* | 1/2013 | Nakano | H04B 7/0452 370/312 |
| 2014/0029562 | A1* | 1/2014 | Kishiyama | H04W 72/082 370/329 |
| 2014/0044091 | A1* | 2/2014 | Kishiyama | H04L 5/0014 370/330 |
| 2014/0086372 | A1* | 3/2014 | Kishiyama | H04J 11/0036 375/346 |

FOREIGN PATENT DOCUMENTS

| | | |
|---|---|---|
| JP | 5864200 | 2/2016 |
| WO | 2009 081514 | 7/2009 |

OTHER PUBLICATIONS

Huawei, "Discussion of MU-MIMO in LTE-A", 3GPP TSG-RAN WGI #58bis, RI-093842, (Oct. 2009), (Total pp. 7).

Kishiyama, Y. et al., "Initial Views on Non-orthogonal Multiple Access Based Radio Interface for Future Radio Access", IEICE Technical Report. RCS, The Institute of Electronics, Information and Communication Engineers, pp. 37-42, (Jul. 2011).

Tse, D. et al. "Fundamentals of Wireless Communication", Cambridge University Press, (2005) (Total pp. 584).

International Search Report Issued Aug. 7, 2012 in PCT/JP12/062648 Filed May 17, 2012.

Combined Chinese Office Action and Search Report issued Nov. 4, 2015 in Patent Application No. 201280022663.2 (with English language translation and English translation of categories of documents).

Office Action issued Jun. 30, 2015 in Japanese Patent Application No. 2011-227152 (with English language translation).

Joerg Schaepperle, et al., "Enhancement of Throughput and Fairness in 4G Wireless Access Systems by Non-Orthogonal Signaling" Bell Labs Technical Journal, vol. 13, No. 4, 2009, pp. 59-77.

Office Action mailed Oct. 18, 2016, in Japanese Patent Application No. 2015-250104 (with English Translation).

* cited by examiner

FIG. 7
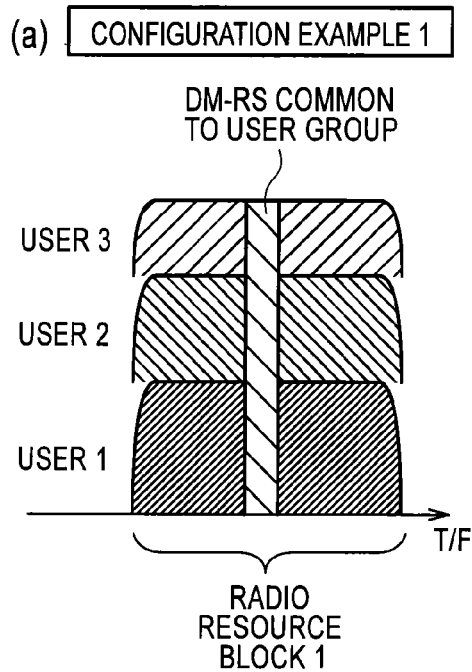
(a) CONFIGURATION EXAMPLE 1
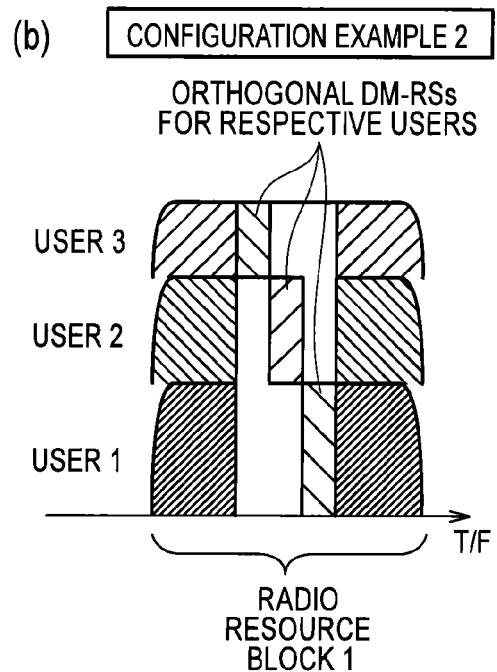
(b) CONFIGURATION EXAMPLE 2
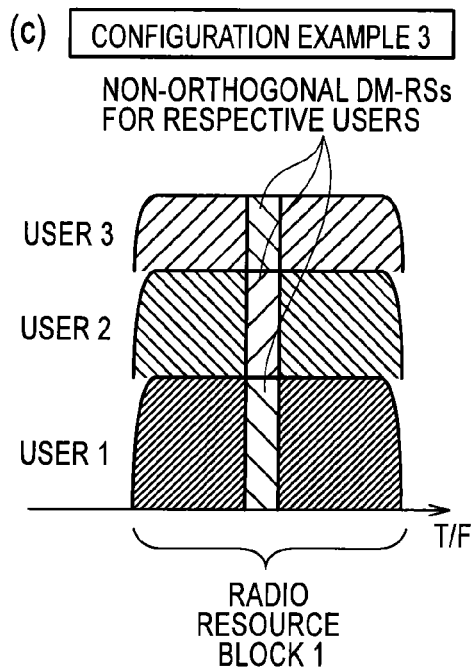
(c) CONFIGURATION EXAMPLE 3
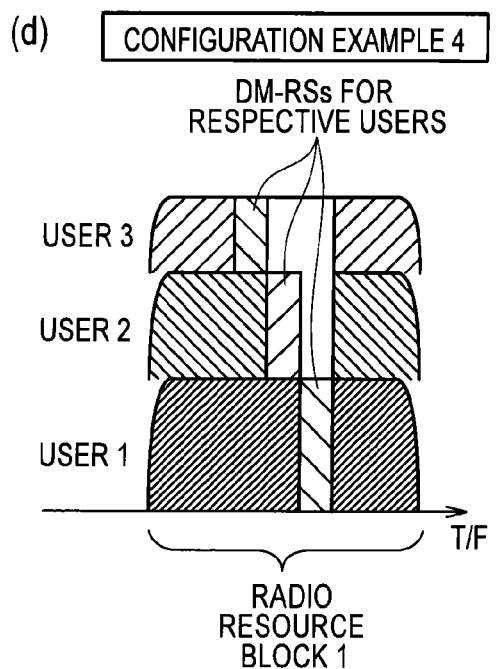
(d) CONFIGURATION EXAMPLE 4

HYBRID ORTHOGONAL/NON-ORTHOGONAL MULTIPLE ACCESS FOR RADIO SIGNAL TRANSMISSION AND RECEPTION

TECHNICAL FIELD

The present invention relates to a receiver, a transmitter and a radio communication method which are adapted to non-orthogonal multiple access.

BACKGROUND ART

Mobile communication systems, for example, Long Term Evolution (LTE) standardized by the 3GPP, widely use orthogonal multiple access in which multiple orthogonal signals not interfering with each other are used between a base station and user terminals (mobile stations). On the other hand, there has been proposed non-orthogonal multiple access using non-orthogonal signals to increase the capacity of a mobile communication system (for example, see Non-patent document 1).

The non-orthogonal multiple access is based on the premise of signal separation (interference canceller) through non-linear signal processing. For example, in the case of downlink, a base station concurrently transmits non-orthogonal signals to multiple user terminals. Each of the user terminals performs signal processing to remove, from the received non-orthogonal signals, a signal addressed to a user terminal (at a cell edge) having a larger path loss than the user terminal itself, and then demodulates the resultant signal.

PRIOR ART DOCUMENT

Non-Patent Document

Non-patent document 1: D. Tse and P. Viswanath, "Fundamentals of Wireless Communication", Cambridge University Press, 2005, <http://www.eecs.berkeley.edu/ to dtse/book.html> on the Internet.

SUMMARY OF THE INVENTION

As described above, in the case of non-orthogonal multiple access, each user terminal, i.e., each mobile station needs to perform demodulation after signal processing of removing the signal addressed to a mobile station having a larger path loss than the mobile station itself. For this reason, the processing load in the mobile station is so high that problems of cost increase and processing delay of the mobile station may occur. A possible solution to these problems is to introduce hybrid orthogonal/non-orthogonal multiple access in which orthogonal multiple access and non-orthogonal multiple access are used in combination. With this introduction, the problems of cost increase and processing delay of the mobile station can be expected to reduce to some degree.

In the implementation point of view, however, it is preferable that each mobile station be able to recognize the conditions of mobile stations multiplexed in non-orthogonal multiple access in order to achieve further cost and processing delay reductions.

Therefore, the present invention has been made in consideration of the above circumstances, and has an objective to provide a receiver, a transmitter, and a radio communication method capable of using non-orthogonal multiple access while suppressing cost increase and processing delay.

In summary, a first feature of the present invention is a receiver (for example, a mobile station 200A) including: a radio signal reception unit (a physical channel segmentation unit 210) configured to receive radio signals including multiple non-orthogonal signals which are not orthogonal to each other; an interference cancellation unit (data demodulating/decoding units 220) configured to extract the non-orthogonal signal addressed to the receiver from the multiple non-orthogonal signals received by the radio signal reception unit, by demodulating and cancelling the radio signal addressed to another receiver; a reference signal reception unit (a physical channel segmentation unit 210) configured to receive a reference signal (DM-RS) to be used by the interference cancellation unit to demodulate and cancel the radio signal; and a demodulation unit (data demodulating/decoding units 220) configured to demodulate the non-orthogonal signal extracted by the interference cancellation unit and addressed to the receiver, on the basis of the reference signal. The reference signal is multiplexed in the same radio resource block as a radio resource block allocated to the non-orthogonal signals, and is multiplexed in the radio resource block in a case where at least one signal is scheduled in the radio resource block.

In summary, a second feature of the present invention is a transmitter (a base station 100) including: a radio signal transmission unit (a hybrid orthogonal/non-orthogonal multiplexer 130 and a physical channel multiplexer 160) configured to transmit radio signals to multiple receivers located within a cell, the radio signals including multiple non-orthogonal signals which are not orthogonal to each other; and a reference signal transmission unit (coding/data modulating units 110) configured to transmit a reference signal to be used by any of the receivers to demodulate and cancel the radio signal addressed to another one of the receivers from the multiple received non-orthogonal signals. The reference signal transmission unit multiplexes the reference signal in the same resource block as a radio resource block allocated to the non-orthogonal signals, and multiplexes the reference signal to the radio resource block in a case where at least one signal is scheduled in the radio resource block.

In summary, a third feature of the present invention is a radio communication method including the steps of: transmitting radio signals from a transmitter to multiple receivers located within a cell, the radio signals including multiple non-orthogonal signals which are not orthogonal to each other; transmitting, from the transmitter, a reference signal to be used by any of the receivers to demodulate and cancel the radio signal addressed to another one of the receivers from the received multiple non-orthogonal signals; receiving the non-orthogonal signals by each of the receivers; receiving the reference signal by each of the receivers; extracting, by any of the receivers, the non-orthogonal signal addressed to the receiver from the multiple non-orthogonal signals by demodulating and cancelling the radio signal addressed to another one of the receivers by use of the received reference signal; and demodulating, by the receiver, the non-orthogonal signal extracted in the extracting step and addressed to the receiver on the basis of the received reference signal.

BRIEF DESCRIPTION OF THE DRAWINGS

FIG. 7 is a diagram illustrating configuration examples 1 to 4 of reference signals (DM-RSs) according to the embodiment of the present invention.

MODES FOR CARRYING OUT THE INVENTION

Figure 1:
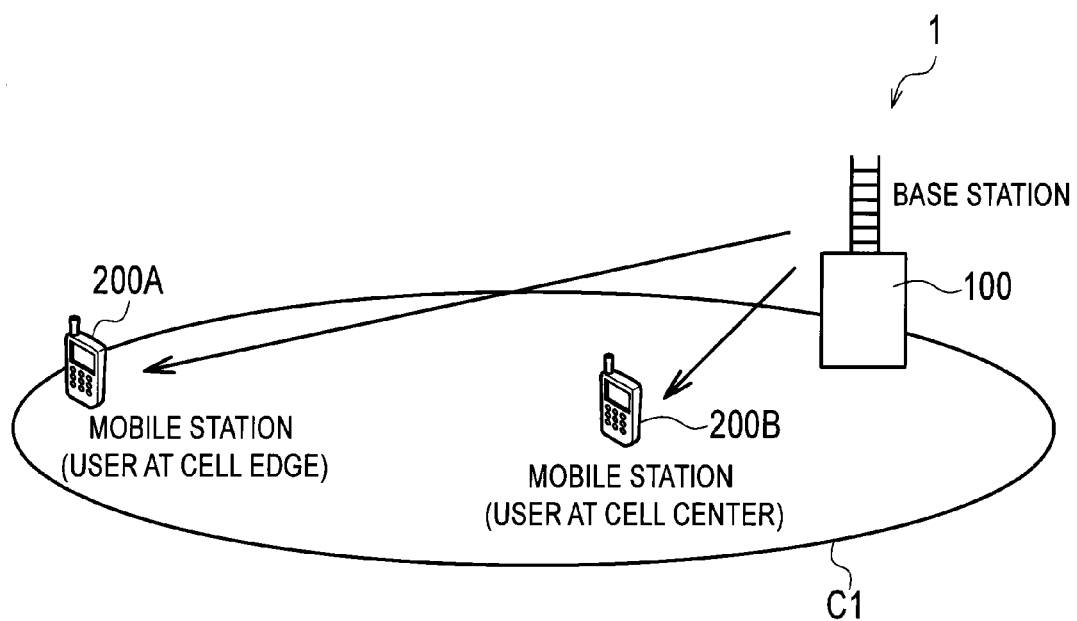
FIG. 1 is a diagram of an overall schematic configuration of a mobile communication system 1 according to an embodiment.

Hereinafter, embodiments of the present invention will be described. Note that, in the following description of the drawings, same or similar reference numerals denote same or similar elements and portions. In addition, it should be noted that the drawings are schematic and ratios of dimensions and the like in the drawings are different from actual ones.

Therefore, specific dimensions and the like should be determined in consideration of the following description. Moreover, as a matter of course, the drawings include portions having different dimensional relationships and ratios from each other.

(1) Overall Schematic Configuration of Mobile Communication System

FIG. 1 is a diagram of an overall schematic configuration of a mobile communication system 1 according to this embodiment. As illustrated in FIG. 1, the mobile communication system 1 includes a base station 100 and mobile stations 200A, 200B.

The base station 100 transmits radio signals to the mobile stations 200A, 200B, more specifically to the inside of a cell C1. In addition, the base station 100 receives radio signals from the mobile stations 200A, 200B. In this embodiment, the base station 100 configures a transmitter and the mobile stations 200A, 200B each configure a receiver.

The mobile station 200A is located within the cell C1 but is located at a cell edge of the cell C1 where a path loss of a radio signal from the base station 100 is large. The mobile station 200B is located in the center within the cell C1. For this reason, the path loss of a radio signal from the base station 100 in the mobile station 200B is smaller than the path loss in the mobile station 200A.

In this embodiment, the base station 100 transmits radio signals to the mobile stations 200A, 200B located in the cell C1, the radio signals including multiple orthogonal signals that are orthogonal to each other, and multiple non-orthogonal signals that are not orthogonal to each other. In other words, the mobile communication system 1 uses a combination of orthogonal multiple access for implementing concurrent communications with multiple mobile stations using orthogonal signals, and non-orthogonal multiple access for implementing concurrent communications with the multiple mobile stations using non-orthogonal signals (hereinafter referred to as hybrid orthogonal/non-orthogonal multiple access).

Figure 2:
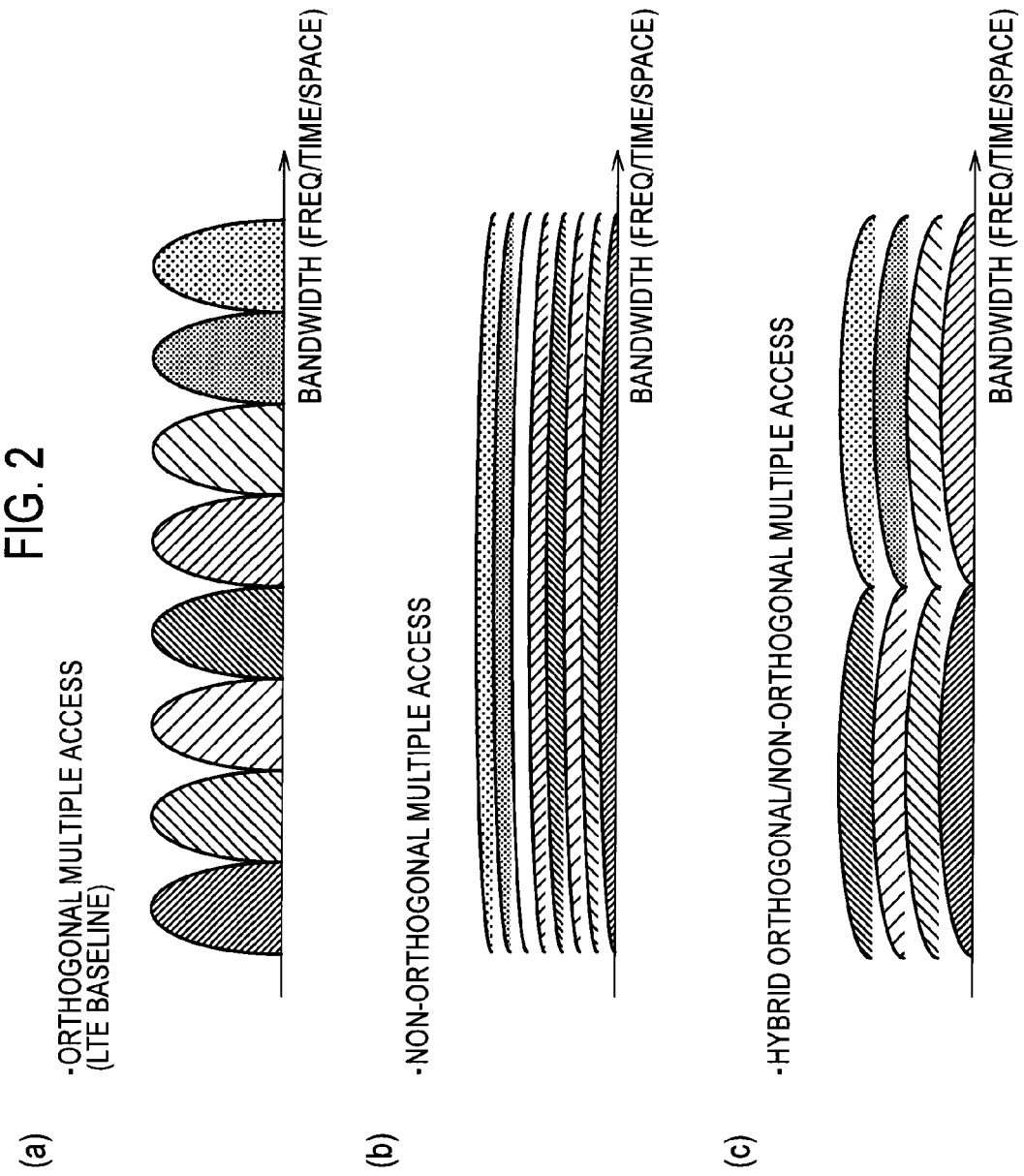
FIG. 2 is a diagram illustrating radio resource allocation images in orthogonal multiple access, non-orthogonal multiple access, and hybrid orthogonal/non-orthogonal multiple access.

Parts (a) to (c) of FIG. 2 illustrate radio resource allocation images in the orthogonal multiple access, the non-orthogonal multiple access, and the hybrid orthogonal/non-orthogonal multiple access. As illustrated in part (a) of FIG. 2, in the orthogonal multiple access, radio resources allocated to mobile stations (users) do not overlap each other in the bandwidth in a frequency domain/time domain/space domain. For this reason, in principle, the orthogonal multiple access does not need to remove interferences from the radio resources allocated to the other mobile stations. The orthogonal multiple access is also used in Long Term Evolution (LTE) standardized by the 3GPP.

As illustrated in part (b) of FIG. 2, in the non-orthogonal multiple access, radio resources allocated to mobile stations (users) overlap each other in the bandwidth mentioned above. For this reason, each mobile station needs to remove all the multiple access interferences through signal processing. The specific signal processing therefor can use the technique described in Non-patent document 1 mentioned above.

As illustrated in part (c) of FIG. 2, in the hybrid orthogonal/non-orthogonal multiple access, radio resources allocated to mobile stations (users) partly overlap each other in the bandwidth mentioned above. For this reason, each mobile station only has to remove multiple access interferences of a prescribed number or less according to the number of multiplexed radio resources.

This embodiment reduces a signal processing load associated with removal of multiple access interferences by introducing the aforementioned hybrid orthogonal/non-orthogonal multiple access, and specifies a radio interface enabling a mobile station to recognize the number of multiple access interferences to be removed.

(2) Functional Block Configuration

Figure 3:
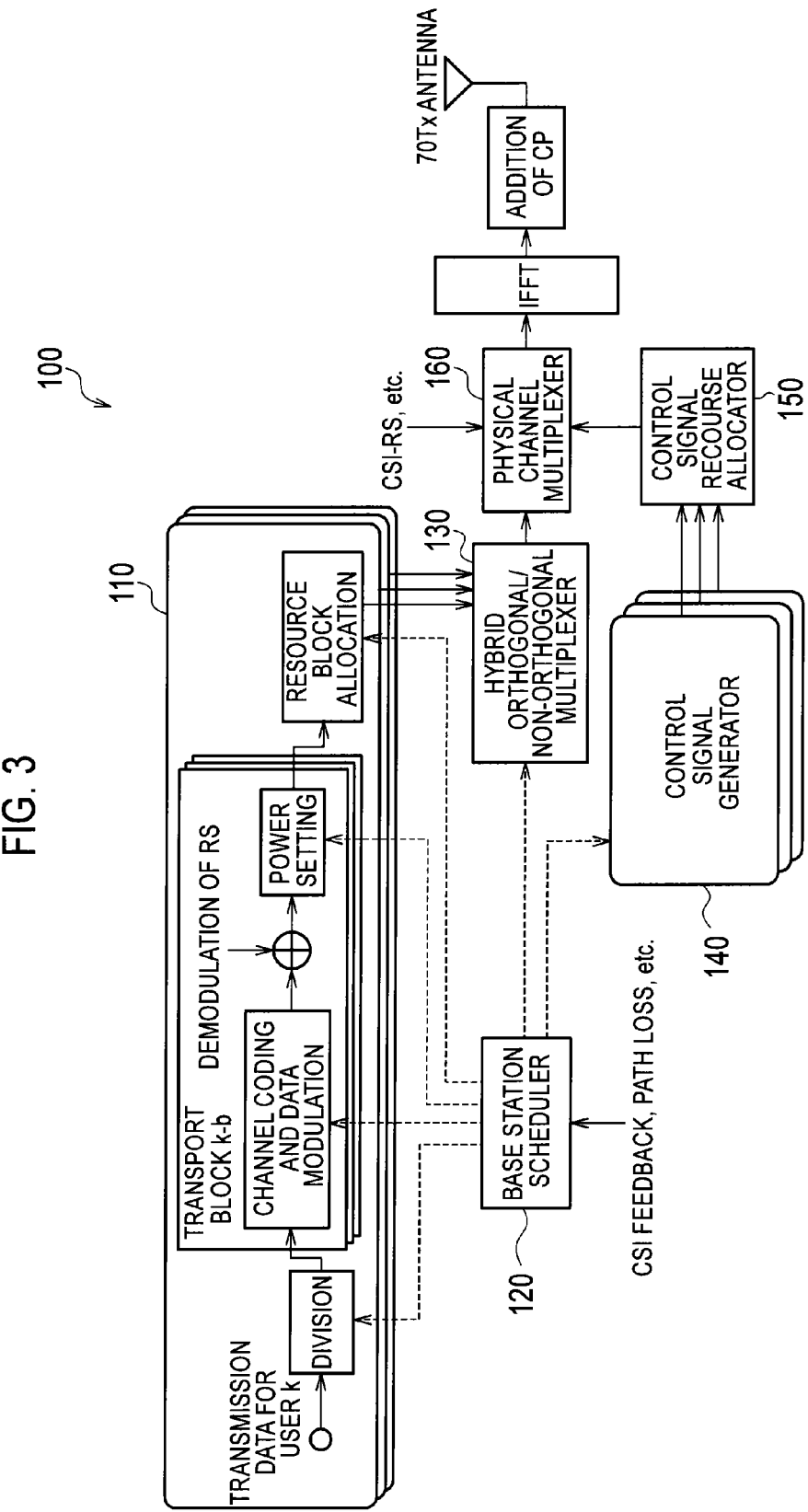
FIG. 3 is a diagram of a functional block configuration of a transmission unit of a base station 100 according to the embodiment of the present invention.
Figure 4:
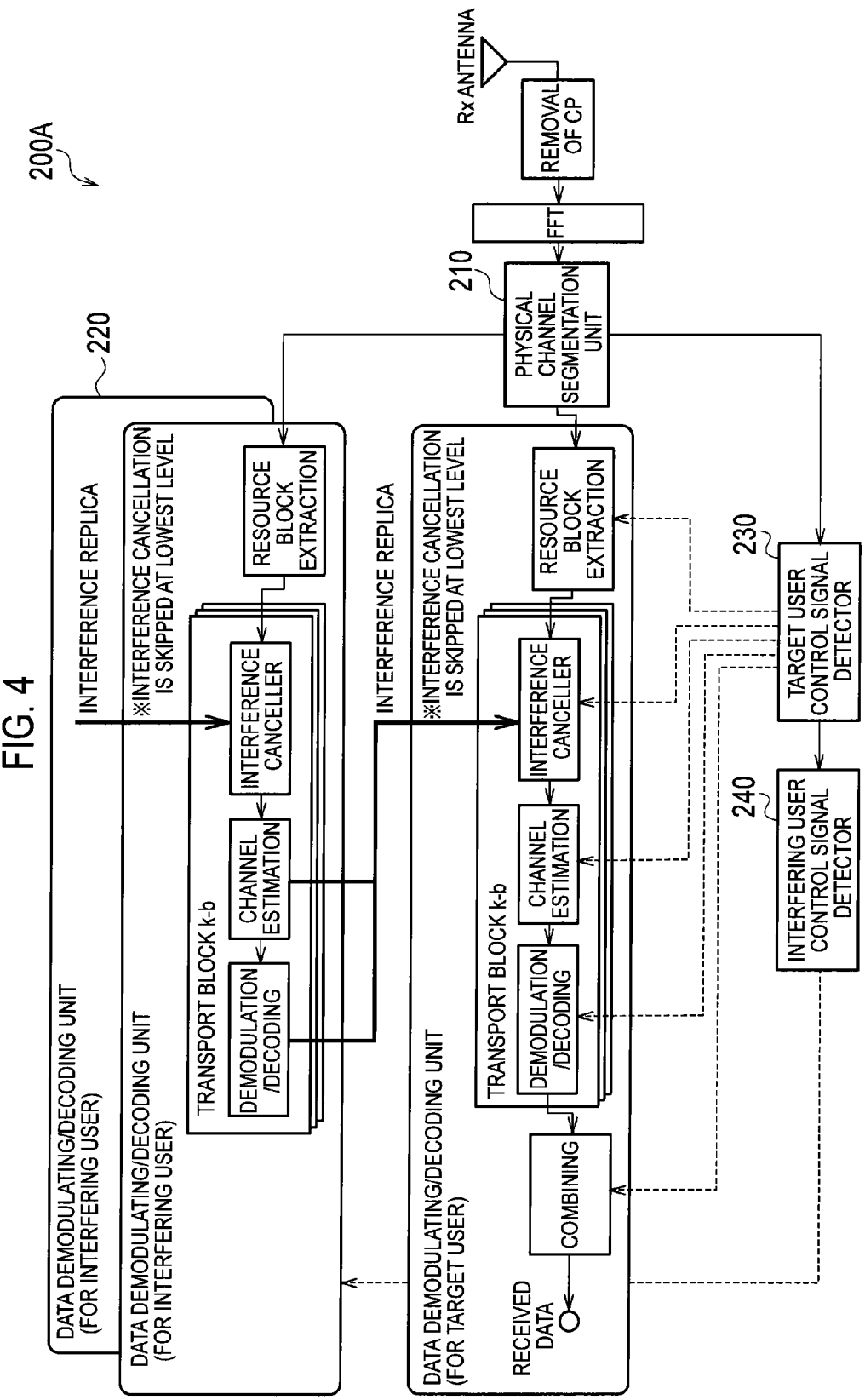
FIG. 4 is a diagram of a functional block configuration of a reception unit of a mobile station 200A according to the embodiment of the present invention.

Next, a functional block configuration of the mobile communication system 1 is described. FIG. 3 is a diagram of a functional block configuration of a transmission unit of the base station 100. FIG. 4 is a diagram of a functional block configuration of a reception unit of the mobile station 200A.

(2.1)

As illustrated in FIG. 3, a transmission unit of the base station 100 includes coding/data modulating units 110, a base station scheduler 120, a hybrid orthogonal/non-orthogonal multiplexer 130, a control signal generator 140, a control signal resource allocator 150 and a physical channel multiplexer 160.

The coding/data modulating units 110 perform division of transmission data, channel coding/data modulation, transmission power setting, and resource block allocation for their respective predetermined users (user k).

In addition, the coding/data modulating units 110 send the mobile stations 200A, 200B a reference signal to be used to cancel multiple access interferences in the mobile stations 200A, 200B, specifically, a reference signal for demodulation (Demodulation-RS; hereinafter, DM-RS). In this embodiment, the coding/data modulating units 110 configure a reference signal transmission unit.

Moreover, the coding/data modulating units 110 send the mobile stations 200A, 200B control information to be used to acquire the reference signal. In this embodiment, the coding/data modulating units 110 configure a control information transmission unit.

The base station scheduler 120 controls the coding/data modulating units 110, the hybrid orthogonal/non-orthogonal multiplexer 130 and the control signal generator 140 on the basis of information such as feedbacks of Channel State Information (CSI) from the mobile stations 200A, 200B, and the path loss between the base station 100 and each of the mobile stations 200A, 200B.

In this embodiment in particular, the base station scheduler 120 schedules signals multiplexed as non-orthogonal signals for multiple mobile stations (for example, the mobile stations 200A, 200B), on the basis of the path losses of the signals multiplexed as non-orthogonal signals to the respective multiple mobile stations, in such a way that the signals can have a large difference in the path loss among them.

Figure 5:
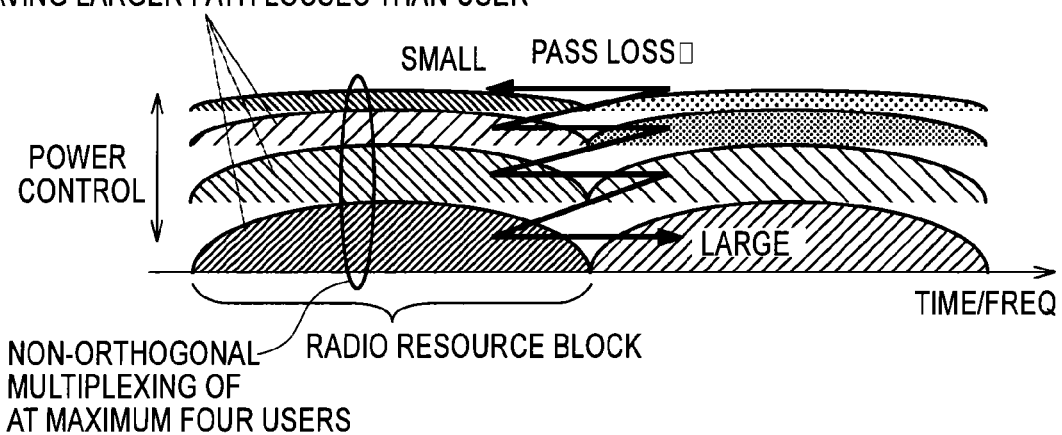
FIG. 5 is a diagram illustrating an example of scheduling of non-orthogonal signals for mobile stations in the base station 100 according to the embodiment of the present invention.

FIG. 5 illustrates an example of scheduling of non-orthogonal signals for mobile stations in the base station 100. The example illustrated in FIG. 5 uses non-orthogonal signals with which at maximum four users (mobile stations) are multiplexed. As illustrated in FIG. 5, in the case of non-orthogonal signals, multiple signals are not orthogonal to each other, in other words, the same radio resource block in the frequency domain or time domain is allocated to the multiple signals.

In this embodiment, signals are multiplexed as non-orthogonal signals sequentially from a signal addressed to a mobile station having the smallest path loss to a signal addressed to a mobile station having the largest path loss. A signal addressed to a mobile station having a small path loss only needs low transmission power to surely obtain a desired SNR, and therefore accounts for a small share in a vertical axis (transmission power) direction in FIG. 5. On the other hand, a signal addressed to a mobile station having a large path loss needs high transmission power to surely obtain a desired SNR, and therefore accounts for a large share in the vertical axis (transmission power) direction in FIG. 5.

In the case of using such non-orthogonal signals, for example, the user (mobile station) having the second smallest path loss needs to remove interferences from the signals allocated to the two mobile stations having the larger path losses than the user (see explanation in the drawing).

Note that, the example illustrated in FIG. 5 also uses orthogonal signals to which different radio resource blocks in the frequency domain and time domain are allocated, i.e., multiple signals orthogonal to each other. Since the aforementioned interference does not occur between the orthogonal signals, the mobile stations do not have to remove the interference.

The hybrid orthogonal/non-orthogonal multiplexer 130 multiplexes the orthogonal signals and the non-orthogonal signals. Specifically, the hybrid orthogonal/non-orthogonal multiplexer 130 multiplexes signals (radio resource blocks) outputted from the multiple coding/data modulating units 110 under the control of the base station scheduler 120. As a result, the multiplexed signals as illustrated in FIG. 5 are generated.

The control signal generator 140 generates various kinds of control signals to be broadcasted to the mobile stations 200A, 200B. In this embodiment, in particular, the maximum number of signals multiplexed as non-orthogonal signals (for example, quad multiplexing) is known to the base station 100 and the mobile stations 200A, 200B. The control signal generator 140 generates a control signal necessary for a mobile station to demodulate and cancel radio signals addressed to other mobile stations (other devices).

The control signal generator 140, for example, can generate a signal including the following control information or reference signal in order for the mobile station to demodulate and cancel radio signals addressed to other mobile stations (other devices):

(a) information indicating the number (including 0 or 1) of multiple access interferences to be removed by a user (mobile station);
(b) information indicating the conditions (such as allocated radio resource block, modulation scheme and channel coding rate) of other users, which are needed by the user (mobile station) to remove multiple access interferences;
(c) a reference signal necessary for coherent demodulation in the user (mobile station); and
(d) information (transport block, definition of a radio resource block, transmission power control, feedback control signal, and the like) necessary for allocation of radio resource blocks in the hybrid orthogonal/non-orthogonal multiple access.

The control signal generator 140 may generate a control signal including any one or any combination of the above (a) to (d). The control signal generator 140 transmits the generated control signal to the mobile stations 200A, 200B via the control signal resource allocator 150 and the physical channel multiplexer 160. In this embodiment, the control signal generator 140 configures a control signal transmission unit. The details of the control signal according to this embodiment will be described later.

The control signal resource allocator 150 allocates a radio resource block to the control signal outputted from the control signal generator 140.

The physical channel multiplexer 160 multiplexes baseband signals outputted from the hybrid orthogonal/non-orthogonal multiplexer 130 and the control signal outputted from the control signal resource allocator 150 with each other in physical channels. The signals outputted from the physical channel multiplexer 160 are subjected to IFFT and Cyclic Prefix (CP) is added to the resultant signals. Then, the signals are transmitted to the mobile stations 200A, 200B from a transmission antenna. In this embodiment, the hybrid orthogonal/non-orthogonal multiplexer 130 and the physical channel multiplexer 160 configure a radio signal transmission unit to transmit orthogonal signals and non-orthogonal signals to multiple mobile stations (receivers) located within the cell C1.

(2.2) Mobile Station 200A

As illustrated in FIG. 4, the mobile station 200A includes a physical channel segmentation unit 210, data demodulating/decoding units 220, a target user control signal detector 230 and an interfering user control signal detector 240. Note that the mobile station 200B has the same functional block configuration as the mobile station 200A.

The physical channel segmentation unit 210 receives radio signals transmitted from the base station 100, and performs segmentation of physical channels included in the radio signals. As described above, the radio signals received by the physical channel segmentation unit 210 include the orthogonal signals and the non-orthogonal signals. The segmented physical channels are outputted to the data demodulating/decoding units 220, the target user control signal detector 230 and the interfering user control signal detector 240. In this embodiment, the physical channel segmentation unit 210 configures a radio signal reception unit.

In addition, the physical channel segmentation unit 210 receives the reference signal (DM-RS) to be used by the target user control signal detector 230 to cancel the multiple access interferences. In this embodiment, the physical channel segmentation unit 210 configures a reference signal reception unit.

There are provided multiple data demodulating/decoding units 220. Specifically, the data demodulating/decoding units 220 are provided for interfering users and a target user according to the number of signals (users) multiplexed as non-orthogonal signals. In this embodiment, since at maximum four users are multiplexed, it is preferable to also provide four data demodulating/decoding units 220.

The data demodulating/decoding units 220 each execute radio resource block extraction, interference canceller, channel estimation, demodulation/decoding and decoded data combining.

In particular, in this embodiment, the interference canceller of the data demodulating/decoding units 220 extracts the non-orthogonal signal addressed to the mobile station 200A from the multiple non-orthogonal signals by demodulating and cancelling the radio signals addressed to the other mobile stations (receivers) by use of the orthogonal signals (for example, the foregoing control information and reference signal) included in the received radio signals.

Specifically, the interference canceller extracts the signal addressed to the device itself from the received non-orthogonal signals by signal separation through predetermined signal processing, and cancels the interferences from the signals addressed to the other receivers. Since the maximum number of multiplexed non-orthogonal signals is known (quad multiplexing in this embodiment), the interference canceller demodulates and cancels the radio signals addressed to the other receivers within the range not exceeding the known maximum number of non-orthogonal signals. Note that the interference cancelling method will be described later.

The target user control signal detector 230 detects the control signal addressed to the target user, i.e., the device (mobile station 200A) itself. The target user control signal detector 230 provides the detected control signal to the data demodulating/decoding unit 220 (for the target user). Any one or combination of the above (a) to (d) is used as the control signal.

The interfering user control signal detector 240 detects the control signals addressed to the interfering users, i.e., the other devices (for example, the mobile station 200B). As similar to the target user control signal detector 230, the interfering user control signal detector 240 provides the detected control signals to the data demodulating/decoding units 220 (for the interfering users).

Here, the signal processing in the interference canceller in the data demodulating/decoding units 220 is explained briefly. First, when the mobile station 200A is located at the cell edge of the cell C1 as illustrated in FIG. 1, the interference canceller cannot remove the signal of the mobile station 200B located in the center within the cell C1. For this reason, the data demodulating/decoding units 220 perform the demodulation/decoding directly. Specifically, the signal processing in the user 1 can be explained based on the following computational expression:

[Expression 1]

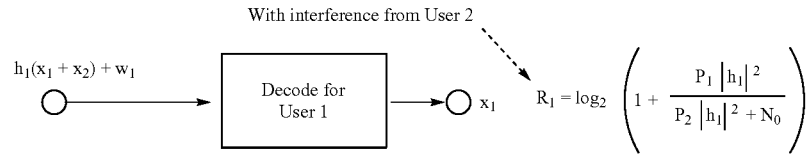

Here, the user 1 denotes the mobile station 200A located at the cell edge of the cell C1, and the user 2 denotes the mobile station 200B located in the center in the cell C1. $P_1$ and $P_2$ are transmission powers of the user 1 and the user 2, and $h_1$ and $h_2$ are channel gains of the user 1 and the user 2.

As described above, in the case where the mobile station (user 1) is located at the cell edge, the received signals ($R_1$) include an interference from the mobile station (user 2) located in the cell center, but the user 1 cannot remove the interference from the user 2 because having a poorer SNR than the user 2. Hence, the user 1 executes the demodulation/decoding directly without removing the signal of the user 2.

On the other hand, the signal processing in the user 2 can be explained based on the following computational expression:

[Expression 2]

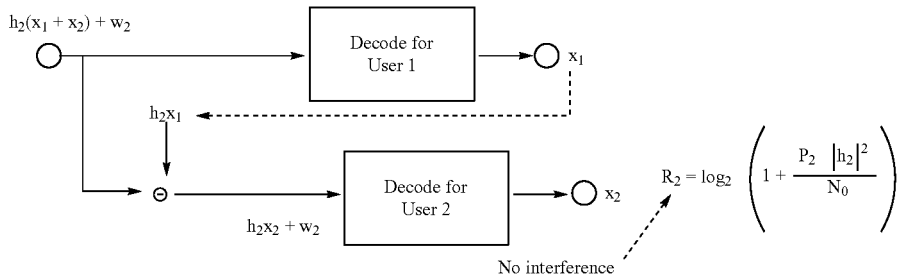

As described above, in the case where the mobile station (user 2) is located at the cell center, the received signals ($R_2$) include an interference from the mobile station (user 1)

located at the cell edge. Since the user 2 has a better SNR than the user 1, the user 2 removes the signal of the user 1 by decoding it once, and then demodulates/decodes the signal of the user 2 after removing the signal of the user 1.

Note that this signal processing is the same as the method described in above Non-patent document 1.

(3) Configurations of Reference Signals

Figure 6:
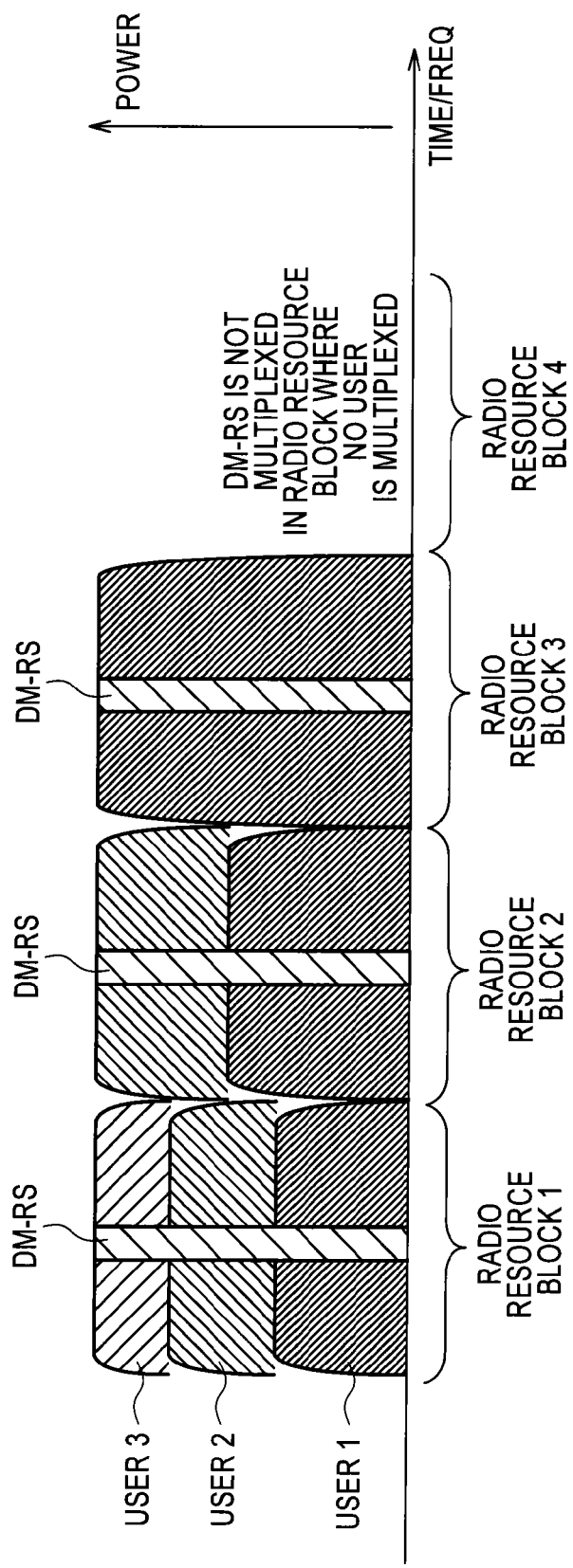
FIG. 6 is an explanatory diagram of a method of multiplexing reference signals (DM-RSs) according to the embodiment of the present invention.

Next, description is provided for configuration examples of reference signals (DM-RSs) used in this embodiment. To be more specific, description is provided for DM-RS multiplexing methods and DM-RS configuration examples.
(3.1) Methods of Multiplexing Reference Signals FIG. 6 is an explanatory diagram of methods of multiplexing reference signals (DM-RSs). As illustrated in FIG. 6, a DM-RS is used in a case where multiple users (mobile stations) are non-orthogonally multiplexed in a single radio resource block (in a time domain/frequency domain). The DM-RS is multiplexed in the same radio resource block as the radio resource block allocated to the non-orthogonal signals. For example, as illustrated in FIG. 6, when users 1 to 3 are non-orthogonally multiplexed, the DM-RS is multiplexed in the same radio resource block (block 1 in the drawing) as the non-orthogonal signals where the users 1 to 3 are multiplexed with each other.

In addition, as in radio resource blocks 2 and 3, in a case where a signal addressed to at least one user is scheduled and multiplexed in a radio resource block, i.e., the signal is multiplexed in the radio resource block, the DM-RS is multiplexed in the radio resource block.

Thus, as in a radio resource block 4, the DM-RS does not have to be multiplexed in a radio resource block where no user is multiplexed.
(3.2) Configuration Examples of Reference Signals Parts (a) to (d) of FIG. 7 illustrate configuration examples 1 to 4 of reference signals (DM-RS). The configuration examples of DM-RS illustrated in parts (a) to (d) of FIG. 7 can be applied to a case where multiple users (hereinafter referred to as a non-orthogonal user group) are non-orthogonally multiplexed in a single radio resource block (in the time domain/frequency domain) as described above.

In a configuration example 1 illustrated in part (a) of FIG. 7, a common DM-RS is applied to a non-orthogonal user group. Specifically, the coding/data modulating units 110 (reference signal transmission unit) of the base station 100 transmit a common reference signal common to the signals multiplexed in the same radio resource block and addressed to multiple users.

In the case of the configuration example 1, channel estimation used to cancel interferences can be shared within a user group (users 1 to 3), which is favorable to ensure the channel estimation accuracy and only requires low overhead. On the other hand, since the common DM-RS is applied, data demodulation for each of the users requires a transmission power ratio among the users within the non-orthogonal user group.

In a configuration example 2 illustrated in part (b) of FIG. 7, DM-RSs for respective users are applied within a non-orthogonal user group. Specifically, the coding/data modulating units 110 transmit multiple reference signals respectively for multiple signals multiplexed in the same radio resource block. In the example illustrated in part (b) of FIG. 7, since users 1 to 3 are non-orthogonally multiplexed, DM-RSs dedicated to the respective users 1 to 3 are transmitted. The three DM-RSs dedicated to the users 1 to 3, i.e., multiple reference signals are orthogonally multiplexed with each other.

In the case of the configuration example 2, the coding/data modulating units 110 transmit control information, which indicates a reference signal resource for a certain receiver (for example, the mobile station 200A) included in multiple receivers (the mobile stations 200A, 200B) and a reference signal resource for another one of the receivers (for example, the mobile station 200B), to the mobile station 200A. Specifically, the coding/data modulating units 110 send the mobile station 200A the information indicating the time domain/frequency domain and orthogonal code of the reference signal resource for the mobile station 200A, and information on Puncture and Rate matching of a reference signal for the mobile station 200B.

In the case of the configuration example 2, since the dedicated DM-RSs are used, the transmission power ratio among the users in the non-orthogonal user group is not needed. However, the overhead is increased and the channel estimation accuracy is lowered as compared with the configuration example 1.

In a configuration example 3 illustrated in part (c) of FIG. 7, DM-RSs for respective users are applied as in the configuration example 2. However, the multiple DM-RSs are not orthogonally multiplexed but are code-multiplexed with each other.

In the case of the configuration example 3, the coding/data modulating units 110 transmit control information, which indicates a signal sequence for a certain receiver (for example, the mobile station 200A) included in multiple receivers (the mobile stations 200A, 200B) and a signal sequence for another one of the receivers (for example, the mobile station 200A) of an interference cancellation target, to the mobile station 200A. Specifically, the coding/data modulating units 110 send the mobile station 200A information indicating scramble code used for the reference signal for the mobile station 200A and scramble code used for the reference signal for the mobile station 200B.

In the case of the configuration example 3, the transmission power ratio among the users in the non-orthogonal user group is unnecessary as in the configuration example 2. As compared with the configuration example 2, the overhead is low. On the other hand, since the DM-RSs are not orthogonal to each other, the channel estimation accuracy is largely lowered due to the influence of inter-code interference.

In a configuration example 4 illustrated in part (d) of FIG. 7, DM-RSs for respective users are applied as in the configuration example 2. However, the multiple DM-RSs are not multiplexed in a manner completely orthogonal to each other but are multiplexed in a method using a combination of orthogonal multiplexing and non-orthogonal multiplexing. Specifically, in the configuration applied herein, orthogonal multiplexing is applied to a user targeted for interference cancellation, while non-orthogonal multiplexing is applied to a user not targeted for interference cancellation. In the case of part (d) of FIG. 7, the DM-RS for a user 1 is orthogonal to the DM-RSs for users 2 and 3, while the DM-RS for the user 2 is orthogonal to the DM-RS for user 3 only. That is to say, the multiple DM-RSs (reference signals) are configured such that a receiver is orthogonal to another receiver targeted for demodulation and cancellation of the radio signal, and is not orthogonal to another receiver not targeted for demodulation and cancellation of the radio signal.

In the case of the configuration example 4, the coding/data modulating units 110 transmit control information, which indicates a reference signal resource for a certain receiver (for example, the mobile station 200A) included in multiple receivers (the mobile stations 200A, 200B) and a reference signal resource for another one of the receivers (for example, the mobile station 200B) targeted for interference cancellation, the mobile station 200A. Specifically, the coding/data modulating units 110 send the mobile station 200A information indicating the time domain/frequency domain and orthogonal code of the reference signal resource for the mobile station 200A, and information on Puncture and Rate matching of a reference signal for the mobile station 200B.

In the case of the configuration example 4, the transmission power ratio among the users in the non-orthogonal user group is unnecessary as in the configuration example 2. In addition, from the view points of the channel estimation accuracy and overhead, this is a well-balanced configuration as compared with the configuration examples 2 and 3.

Moreover, in the configuration examples 2 to 4, the reference signals may be associated with multiple levels corresponding of the number of interference cancellation target users in receivers (mobile stations). With such association with the levels, the control information to be used to acquire the reference signals can be notified to the receivers without an increase in the number of control bits. In addition, in the cases of the configuration examples 3 and 4, the levels may be associated with the positions in the radio resource block.

Table 1 summarizes the aforementioned features of the configuration examples 1 to 4 of DM-RSs.

TABLE 1

|  | Configuration Example 1 | Configuration Example 2 | Configuration Example 3 | Configuration Example 4 |
|---|---|---|---|---|
| Channel Estimation Accuracy | Excellent | Good | Poor (Disadvantage) | Good |
| Overhead | Excellent | Poor (Disadvantage) | Excellent | Good |
| Necessity of Transmission Power Ratio among Users in Non-Orthogonal User Group for Data Demodulation | Necessary (Notification via Control Signal or etc., is Necessary (Disadvantage)) | Unnecessary | Unnecessary | Unnecessary |

(4) Examples of Operation and Effects

In the mobile communication system 1 according to this embodiment, the reference signal (DM-RS) is used to cancel multiple access interferences due to non-orthogonal signals. In addition, the DM-RS is multiplexed in the same radio resource block as a radio resource block allocated to non-orthogonal signals. Moreover, the DM-RS is multiplexed in a radio resource block only when at least one signal for a user is scheduled on the radio resource block.

Thus, the mobile stations 200A, 200B can remove multiple access interferences easily and quickly by using the received DM-RS. In other words, according to the mobile communication system 1, the cost increase and the processing delay of the mobile station can be suppressed in the case where the hybrid orthogonal/non-orthogonal multiple access is introduced.

In addition, as summarized in Table 1, the configuration example 1 of DM-RS has features of easiness in ensuring the channel estimation accuracy and low overhead. The configuration examples 2 to 4 have a feature of the non-necessity of the transmission power ratio among users in the non-orthogonal user group for data demodulation of each user. Moreover, the configuration example 3 has a feature of low overhead as similar to the configuration example 1 (but cannot be expected to achieve as high channel estimation accuracy as in the configuration example 1 or 2). On the other hand, as compared with the configuration examples 2 and 3, the configuration example 4 is a well-balanced configuration from the view points of the channel estimation accuracy and overhead.

(5) Other Embodiment

Although the content of the present invention is disclosed through the embodiment of the present invention as described above, it should not be understood that the description and drawings constituting part of this disclosure limit the present invention. From this disclosure, various alternative embodiments would be obvious to those skilled in the art.

For example, in the foregoing embodiments of the present invention, the examples of downlink from the base station 100 to the mobile stations 200A, 200B are described. However, the present invention can be applied to uplink. Moreover, the present invention can be also applied to radio communications not only between the base station and mobile stations, but also between base stations.

Furthermore, the foregoing embodiments are described by taking as the example the case where the hybrid orthogonal/non-orthogonal multiple access is introduced. The application range of the present invention, however, is not limited to the hybrid orthogonal/non-orthogonal multiple access, but obviously includes any mobile communication system using non-orthogonal multiple access.

As described above, the present invention naturally includes various embodiments which are not described herein. Accordingly, the technical scope of the present invention should be determined only by the matters defining the invention in the scope of claims regarded as appropriate based on the foregoing description.

The entire contents of Japanese Patent Application No. 2011-114034 (filed on May 20, 2011) and Japanese Patent Application No. 2011-227152 (filed on Oct. 14, 2011) are incorporated herein by reference.

INDUSTRIAL APPLICABILITY

According to the features of the present invention, provided are a receiver, a transmitter, and a radio communication method capable of using non-orthogonal multiple access while suppressing cost increase and processing delay.

EXPLANATION OF THE REFERENCE NUMERALS 1 mobile communication system
100 base station
110 coding/data modulating unit
120 base station scheduler
130 hybrid orthogonal/non-orthogonal multiplexer
140 control signal generator
150 control signal resource allocator
160 physical channel multiplexer
200A, 200B mobile station
210 physical channel segmentation unit
220 data demodulating/decoding unit
230 target user control signal detector
240 interfering user control signal detector

The invention claimed is:

1. A receiver comprising:
radio signal reception circuitry configured to receive radio signals including a plurality of non-orthogonal signals which are not orthogonal to each other;
interference cancelation circuitry configured to extract a non-orthogonal signal addressed to the receiver from the plurality of non-orthogonal signals received by a communication interface by demodulating and cancelling a radio signal addressed to another receiver; and
reference signal reception circuitry configured to receive a reference signal to be used by the interference cancellation circuitry to demodulate and cancel the radio signal addressed to the another receiver; and
demodulation circuitry configured to demodulate the non-orthogonal signal extracted by the interference cancellation circuitry and addressed to the receiver, on the basis of the reference signal, wherein
the reference signal is multiplexed in a same radio resource block as a radio resource block allocated to the non-orthogonal signals, and
the reference signal is multiplexed in the radio resource block in a case where at least one of the plurality of non-orthogonal signals is scheduled in the radio resource block.

2. A transmitter comprising:
radio signal transmission circuitry configured to transmit radio signals to a plurality of receivers located within a cell, the radio signals including a plurality of non-orthogonal signals which are not orthogonal to each other; and
reference signal transmission circuitry configured to transmit a reference signal to be used by any of the receivers to demodulate and cancel a radio signal addressed to another one of the receivers from the plurality of received non-orthogonal signals, wherein
the reference signal transmission circuitry multiplexes the reference signal in a same resource block as a radio resource block allocated to the non-orthogonal signals, and
in a case where at least one of the non-orthogonal signals is scheduled in the radio resource block, the reference signal transmission circuitry multiplexes the reference signal to the radio resource block.

3. The transmitter according to claim 2, wherein
the reference signal transmission circuitry transmits a reference signal common to a plurality of non-orthogonal signals multiplexed in the same radio resource block.

4. The transmitter according to claim 2, wherein
the reference signal transmission circuitry transmits a plurality of reference signals respectively dedicated to a plurality of non-orthogonal signals multiplexed in the same radio resource block, and
the plurality of reference signals are orthogonally multiplexed with each other.

5. The transmitter according to claim 2, wherein
the reference signal transmission circuitry transmits a plurality of reference signals respectively dedicated to a plurality of non-orthogonal signals multiplexed in the same radio resource block, and
the plurality of reference signals are code-multiplexed with each other.

6. The transmitter according to claim 2, wherein
the reference signal transmission circuitry transmits a plurality of reference signals respectively dedicated to a plurality of non-orthogonal signals, and
the plurality of reference signals are configured such that a first signal addressed to a first receiver is orthogonal to a second signal addressed to a second receiver targeted for demodulation and cancellation of the first radio signal, but is not orthogonal to a third signal for another user not targeted for demodulation and cancellation of the first radio signal.

7. The transmitter according to claim 4, further comprising:
control information transmission circuitry configured to transmit control information to a certain one of the plurality of receivers, the control information indicating a reference signal resource for the certain receiver and a reference signal resource for another one of the receivers.

8. The transmitter according to claim 5, further comprising:
control information transmission circuitry configured to transmit control information to a certain one of the plurality of receivers, the control information indicating a first signal sequence for the certain receiver and a second signal sequence for another one of the receivers which is targeted for interference cancellation.

9. The transmitter according to claim 6, further comprising:
control information transmission circuitry configured to transmit control information to a certain one of the plurality of receivers, the control information indicating a first reference signal resource for the certain receiver and a second reference signal resource for another one of the receivers which is targeted for interference cancellation.

10. A radio communication method comprising the steps of:
transmitting radio signals from a transmitter to a plurality of receivers located within a cell, the radio signals including a plurality of non-orthogonal signals which are not orthogonal to each other;
transmitting, from the transmitter, a reference signal to be used by any of the receivers to demodulate and cancel the radio signal addressed to another one of the receivers from the plurality of received non-orthogonal signals;
receiving the non-orthogonal signals by each of the receivers;
receiving the reference signal by each of the receivers;
extracting, by any of the receivers, the non-orthogonal signal addressed to the receiver from the plurality of non-orthogonal signals by demodulating and cancelling the radio signal addressed to another one of the receivers by use of the received reference signal; and demodulating, by the receiver, the non-orthogonal signal extracted in the extracting step and addressed to the receiver on the basis of the received reference signal.

* * * * *